Sept. 11, 1934. J. C. WOODFORD 1,973,677
LIQUID DISPENSING APPARATUS
Filed March 7, 1934 5 Sheets-Sheet 1
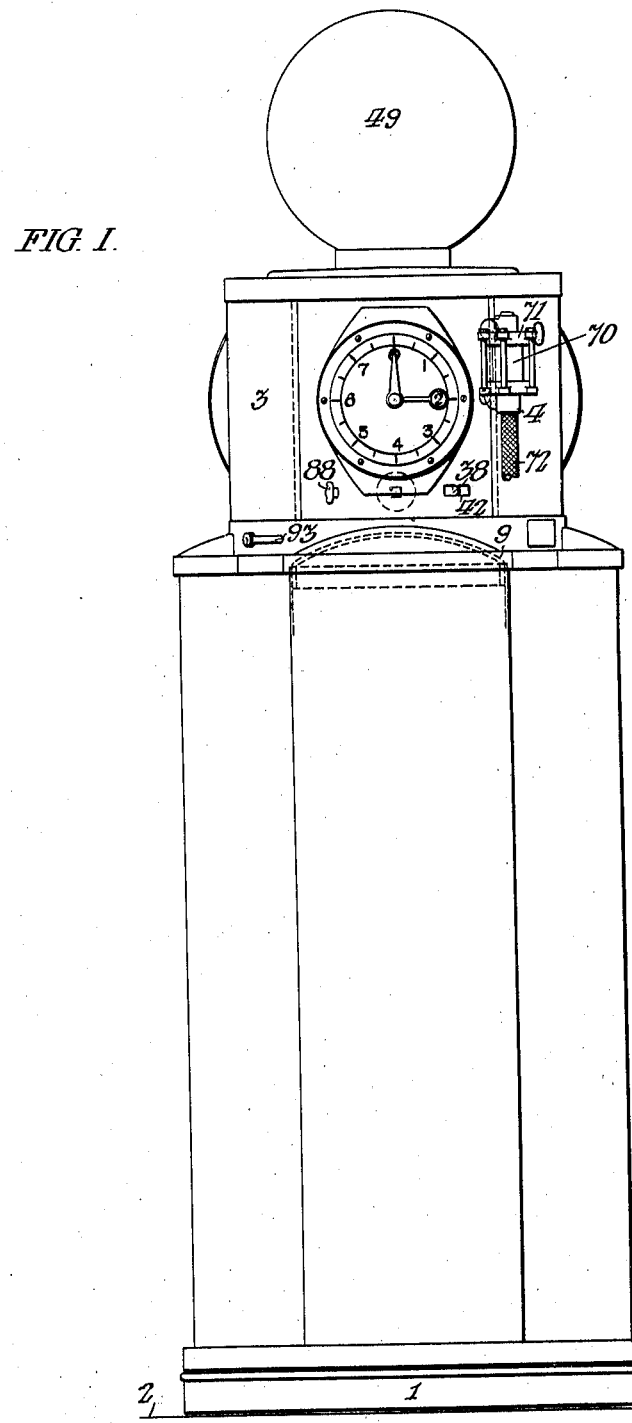
FIG. I.
INVENTOR:
JOSEPH C. WOODFORD, Sept. 11, 1934.  J. C. WOODFORD  1,973,677
LIQUID DISPENSING APPARATUS
Filed March 7, 1934  5 Sheets-Sheet 2
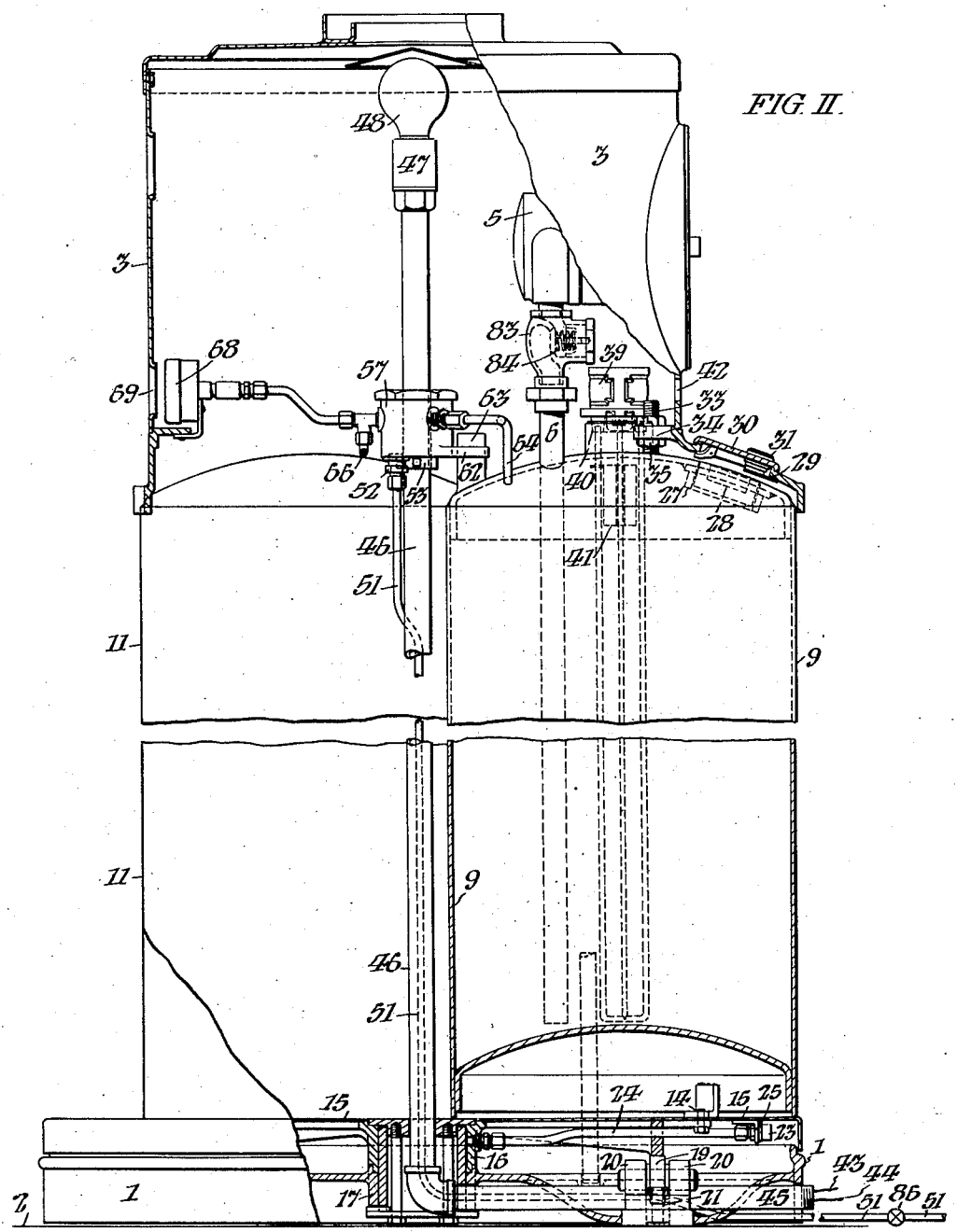
FIG. II.
INVENTOR:
JOSEPH C. WOODFORD,
BY Sept. 11, 1934.     J. C. WOODFORD     1,973,677
LIQUID DISPENSING APPARATUS
Filed March 7, 1934     5 Sheets-Sheet 3
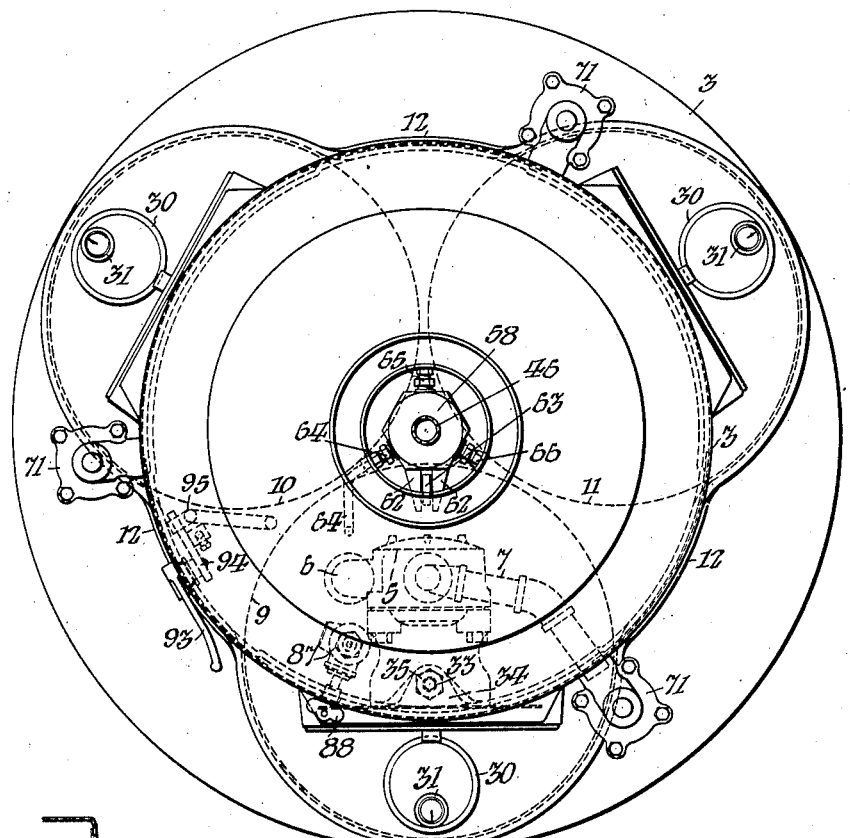
FIG. III.
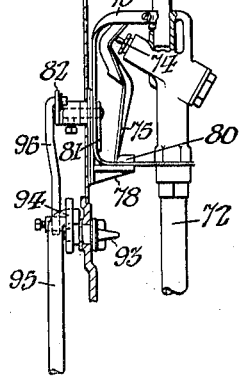
FIG. IV.
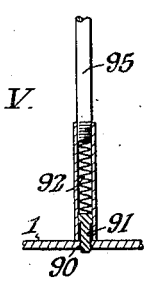
FIG. V.
INVENTOR:
JOSEPH C. WOODFORD,
BY

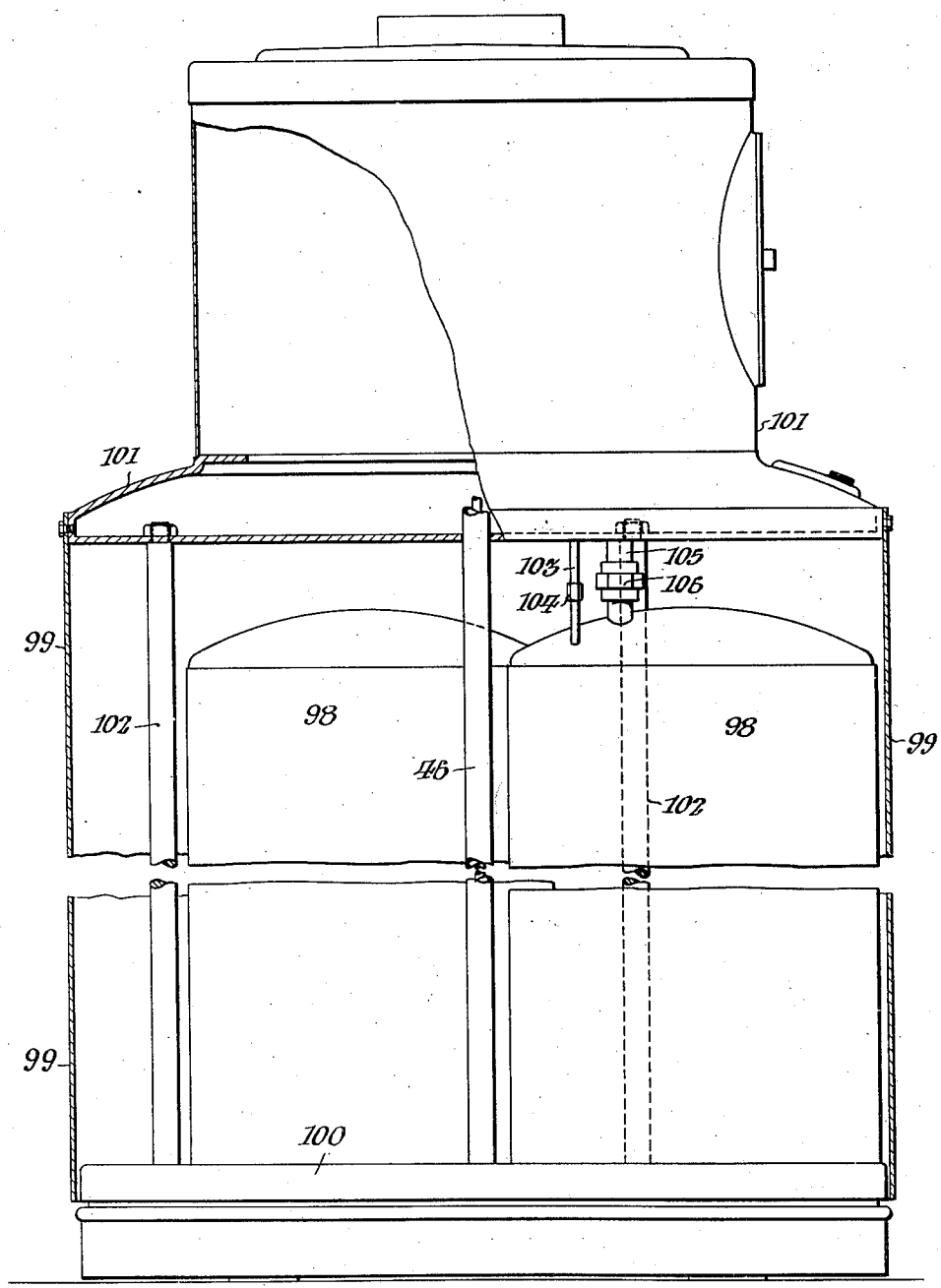

Sept. 11, 1934.    J. C. WOODFORD    1,973,677
LIQUID DISPENSING APPARATUS
Filed March 7, 1934    5 Sheets-Sheet 5
FIG. VII.
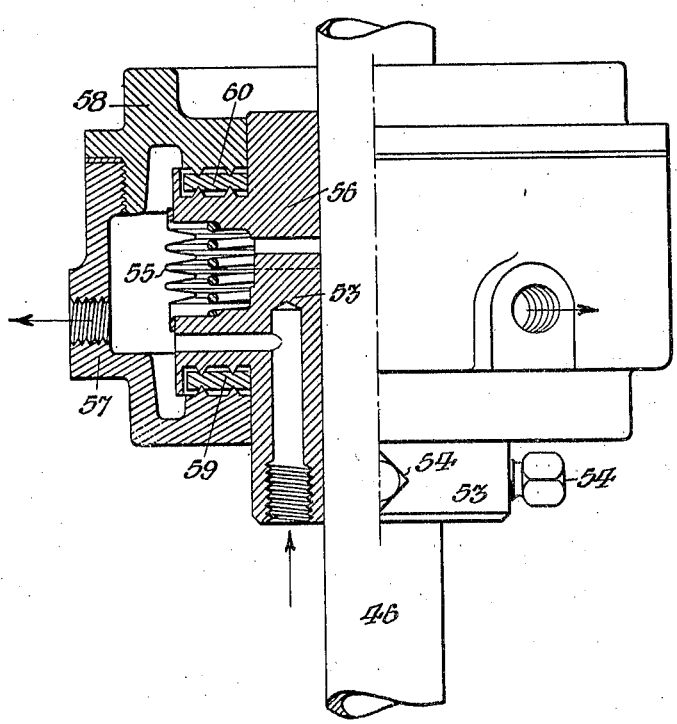
INVENTOR:
JOSEPH C. WOODFORD,
BY Patented Sept. 11, 1934

1,973,677

UNITED STATES PATENT OFFICE 1,973,677

LIQUID DISPENSING APPARATUS

Joseph C. Woodford, Haverford, Pa., assignor to Service Station Equipment Company, Conshohocken, Pa., a corporation of Delaware Application March 7, 1934, Serial No. 714,380

7 Claims. (Cl. 221—95)

My invention is particularly applicable for dispensation of liquid from what is termed an "island" of an automobile service station; to wit, a narrow platform between driveways for vehicles to which liquid may be dispensed from either side of the platform. Ordinarily, the liquid dispensing apparatus employed on such islands is stationary, so that, in order to manifest to purchasers upon opposite sides of the island the amount of liquid which is being dispensed to them, it is necessary to provide such stationary apparatus with meter mechanism having dials upon both sides of the apparatus manifesting the volume dispensed. Such mechanism is costly and it is the purpose and effect of my invention to minimize the cost of such volume indicating mechanism by having but one such mechanism associated with each liquid dispensing hose and rotatable with the latter so as to present the face of the indicator upon whichever side of the island it is required for the customer to see it.

Moreover, a further object and effect of my invention is to provide such apparatus capable of dispensing a plurality of different grades or kinds of liquid, such as lubricating oil, at a minimum cost of construction and maintenance. As hereinafter described, a convenient embodiment of my invention includes a liquid dispensing apparatus having at the upper portion thereof a rotatable head carrying three liquid dispensing hose respectively associated with three meters which are cooperatively connected with three containers for different liquids, grades of lubricating oil, within a casing which is rotatable with said head upon a base plate which may be made stationary upon such an island. I avoid the cost of providing said containers with any pumping means by respectively connecting them in common to a single conduit conducting compressed air from any convenient source; preferably the usual tank with which such service stations are provided for inflating automobile tires.

As hereinafter described, the liquid containers associated with the rotary meter head aforesaid may be maintained stationary, or may be mounted to be turned with the rotary meter head, either permanently or detachably connected with the latter. My invention includes the various novel features of construction and arrangement hereinafter more definitely specified.

In said drawings, Fig. I is an elevation of a liquid dispensing apparatus conveniently embodying my invention and including three liquid containers disposed in a circular series.

Fig. II is a fragmentary vertical sectional view of the structure indicated in Fig. I, section being taken diametrically through one of the containers and the casing inclosing the entire group of containers.

Fig. III is a plan view of the structure shown in Fig. I.

Fig. IV is a fragmentary vertical sectional view of said structure shown in Fig. I, showing one of the dispensing hose nozzles and means for detaining it in inoperative position.

Fig. V is a fragmentary vertical sectional view of a portion of the stationary base and means for locking the casing against rotation thereon.

Fig. VI is a fragmentary vertical sectional view showing a modified form of my invention wherein the liquid containers are in detachable relation with the casing.

Fig. VII is a fragmentary vertical sectional view of the coupling including a stationary and a rotary member through which compressed air is supplied to eject the liquid.

In said figures, the stationary supporting base 1 may be rigidly secured to a service station island 2, or other foundation, by any convenient means. The rotary head 3 is mounted to turn on said support 1, as hereinafter described, and carries one or more liquid dispensing outlets 4 in association with respective meters 5 and liquid conduit means 6 and 7 for connecting a liquid supply with said meter and said meter with said outlet. In the form shown in Figs. I, II, and III, said head 3 carries three meters, and said head may be turned on said support 1 to present any selected one of said meters within the line of vision of the purchaser of the liquid dispensed.

In the form shown in Figs. I, II, and III which is adapted to dispense three different liquids, for instance, three different grades of lubricating oil; the liquids are respectively supplied from containers 9, 10, and 11 arranged in a circular series beneath said head 3 and within the casing 12.

As shown at the lower part of Fig. II, said containers and casing are conveniently rigidly connected by the tap bolts 14 with the rotary carriage 15 which has the cylindrical tubular hub 16 encircling the stationary tubular bearing 17 on said base 1 and is supported upon a circular series of three rollers 19 journaled in bearings 20 rigidly connected with said base by the tap bolts 21. Said hub 16 may be supplied with lubricant through the fitting 23 and tube 24 which are supported in said carriage by the bracket 25.

Each of said containers 9, 10, and 11 has an inlet 27 for liquid normally closed by a plug 28 which is in registry with an opening 29 in said head 3 provided with a cover 30 which may be normally secured in closed position by the lock 31.

Each of said containers may also be conveniently rigidly connected with said head 3 by respective stud bolts 33 extending through lugs 34 on said head and provided with nuts 35 indicated at the upper right hand portion of Fig. II.

I also find it convenient to provide each of said containers 9, 10, and 11 with means to indicate the volume of liquid remaining therein; conveniently including an index member 38 within a transparent cylinder 39 held in the plug 40 and adapted to be turned by a suitable connection with the float 41. Said indicators are respectively visible through windows 42 which are conveniently visible respectively at the right of each meter 5, as indicated in Fig. I.

Electrical conductors 43 and 44 are extended through the conduit comprising the horizontal member 45 and the vertical member 46 which are in rigid relation with said base 1; said member 46 having the socket 47 at the top thereof for the incandescent electric lamp bulb 48 which is energized by way of said conductors and serves to illuminate the dials of said meters 5 and a globe 49 on the top of the rotary head 3, which globe may carry an advertisement.

Said electric conductor conduit 46 serves as a convenient support for the compressed air conduit 51 which, as indicated in Fig. II, is conveniently a small copper pipe extending through the base 1 and upward parallel with said conduit 46 to the fitting 52 in the coupling member 53 which may be rigidly connected with said conduit 46 by the set screws 54. Said coupling member 53 is connected by the sylphon bellows 55 with the coupling member 56 which is thereby prevented from turning, but is capable of relative axial movement with respect to the stationary coupling member 53 so as to cooperate with the rotary coupling member comprising the two parts 57 and 58 which are maintained in airtight relation with the non-rotatable coupling members 53 and 56 by the interposition of gaskets 59 and 60 of suitable resilient material, for instance, leather saturated with oil. Said rotary coupling member 57 has the fork 62 engaging the lug 63 projecting upwardly from the container 9 so as to be rotated with the head 3, and is provided with respective conduits 64, 65, and 66 respectively connected with said liquid containers 9, 10, and 11 so as to subject the liquid in said containers to air pressure from a common source. The degree of air pressure may be indicated by the gage 68 which is conveniently connected with the conduit 66 and is visible through the window opening 69 in the side wall of said head, as indicated in Fig. II.

As indicated in Fig. I, each of said outlets 4 may include a sight gage comprising a transparent vessel 70 mounted in a metal frame 71. Each of said outlets 4 is conveniently provided with a flexible hose 72 having at the discharge end thereof a nozzle 73, such as indicated in Fig. IV, provided with a valve 74 which is operable by the hand lever 75 within the guard 76. Each of said nozzles and the hose pendent therefrom may be supported in idle position by respective brackets 78 carried by said rotary head 3. The distal end of each nozzle 73 may be thrust through respective openings 79 in the side wall of said head 3, as indicated in Fig. IV, and each guard 76 is provided with an opening in the lower portion thereof indicated in Fig. IV, to fit over the lug 80 on the bracket 78 so as to hold the nozzle in vertical position on said bracket, and each nozzle may be detained in such inoperative position as shown in Fig. IV by any convenient locking means, for instance, a turn button 81 may be pivoted in the side wall of said head 3 so that it may be turned in front of the guard 76 when the latter is on the bracket 78, as shown in Fig. IV, to detain the nozzle on said bracket. Such turn buttons may be coupled for simultaneous movement by any suitable means which may be locked and unlocked at the will of the operator.

In order to prevent reverse operation of the meters aforesaid by injection of inferior liquid in the reverse direction through the dispensing hose 72, I find it convenient to include in each of the conduits 6 a check valve 83 which is pressed by the spring 84 in a direction opposite to the direction of dispensation of the liquid, so as to close said valve except when it is opened by the pressure of liquid being dispensed.

In order to prevent any dispensation of liquid at the will of the operator, I provide the valve 86 controlling the supply of compressed air to the dispensing apparatus aforesaid which valve may be located within the service station, or any other convenient place, and provide the valve 87 within the head 3 having the handle 88 projecting exterior to said head, as indicated in Fig. I, so that after the valve 86 is closed to stop the supply of compressed air to the apparatus, said valve 87 may be opened to permit the escape of compressed air from the top of each of the containers 9, 10, and 11 so that no oil can be dispensed from them unless and until said valve 87 is again closed and the valve 86 opened.

In order to prevent any one from turning the casing and head upon their support when it is desired to leave the apparatus in inoperative condition; I find it convenient to provide the socket 90 in the stationary base 1 to receive the lower end of the slide bolt 91 which is continually pressed by the spring 92 to engage said bolt with said socket. The handle 93 projecting exterior to the head 3, as shown in Fig. I, is connected with the lever 94 which may be operatively connected by the link 95 to lift said slide bolt 91 to inoperative position or lower it to permit it to be engaged by said socket 90. Said lever may also be connected by the link 96 with the lever 82 of the turn button 81 to detain or release the hose nozzle or nozzles on their respective brackets 78.

In the form of my invention shown in Fig. VI; the liquid containers 98 are in detachable relation with the casing 99 and carriage 100; the latter being rigidly connected with the rotary head 101 by the bolt standards 102. Each of said containers 98 is detachably connected with a compressed air supply conduit 103 by a coupling 104 and is detachably connected with a liquid dispensing outlet conduit 105 by the coupling 106. The arrangement is such that each of said containers 98 may be removed when emptied and replaced with a container filled with liquid. Otherwise it is to be understood that the construction and arrangement is such as above described with reference to the other figures of the drawings.

However, I do not desire to limit myself to the precise details of construction and arrangement herein set forth, as it is obvious that various modifications may be made therein without departing from the essential features of my invention, as defined in the appended claims.

I claim:

1. In liquid dispensing apparatus, the combination with a stationary supporting base; of a casing mounted to rotate on said base; a head fixed on said casing and rotatable therewith and carrying a liquid dispensing outlet; a meter carried by said rotary head in association with said outlet; a liquid container carried by said casing; liquid conduit means connecting said container with said meter and said meter with said outlet; a compressed air conduit within said casing in stationary relation with sa'd base; coupling means connecting said air conduit with said container; whereby compressed air may be supplied to said container to eject liquid therefrom through said meter and outlet; including an electric conductor conduit fixed in said stationary base in coaxial relation with said casing and having an electric lamp at the top thereof above said head, for illuminating said meter; said compressed air conduit being supported in connection with said electrical conductor conduit and having a stationary coupling member in concentric relation with the latter conduit; another member of said coupling being mounted to rotate upon said electric conductor conduit in cooperation with said stationary coupling member.

2. In liquid dispensing apparatus, the combination with a stationary support; of a rotary head on said support carrying a liquid dispensing outlet; a flow meter with rotary volume indicating means carried by said rotary head in association with said outlet; liquid conduit means for connecting a liquid supply with said meter and said meter with said outlet; whereby said head may be turned, on said support, to present said meter indicating means within the line of vision of the purchaser of the liquid dispensed; and means for preventing rotation of said head, at the will of the operator, including a lock socket carried by said support and a reciprocatory lock bolt carried by said head.

3. In liquid dispensing apparatus, the combination with a stationary support; of a rotary head on said support carrying a liquid dispensing outlet; a flow meter with rotary volume indicating means carried by said rotary head in association with said outlet; liquid conduit means for connecting a liquid supply with said meter and said meter with said outlet; whereby said head may be turned, on said support, to present said meter indicating means within the line of vision of the purchaser of the liquid dispensed; and means for preventing rotation of said head, at the will of the operator, including a lock socket carried by said support and a reciprocatory lock bolt carried by said head, and a spring stressing said lock bolt toward engagement with said socket.

4. In liquid dispensing apparatus, the combination with a stationary supporting base; of a casing mounted to rotate on said base; a circular series of liquid containers fixed in said casing; a head fixed on said casing and rotatable therewith and carrying respective liquid dispensing outlets from each of said containers; a circular series of meters carried by said rotary head, each meter being associated with one of said outlets; liquid conduit means respectively connecting said containers with respective meters and the respective meters with said outlets, a compressed air conduit within said casing; coupling means connecting said air conduit with each of said containers; whereby compressed air may be supplied to said containers to eject liquid therefrom through the respective meters and outlets.

5. Apparatus as in claim 4, including a support fixed in said stationary base and extending upward in coaxial relation with said casing; said compressed air conduit having a stationary coupling member at the top thereof and means rigidly connecting it with said coaxial support; another member of said coupling being mounted to rotate upon said coaxial support in cooperation with said stationary coupling member; whereby the compressed air is supplied to the several containers from a common source.

6. In liquid dispensing apparatus, the combination with a stationary supporting base; of a casing mounted to rotate on said base; a head fixed on said casing and rotatable therewith and carrying a liquid dispensing outlet; a meter carried by said rotary head in association with said outlet; a liquid container carried by said casing; liquid conduit means, within said casing, connecting said container with said meter and said meter with said outlet; roller bearings between said base and casing, for supporting the weight of the casing and its contents; means for preventing rotation of said casing, at the will of the operator, including a lock socket carried by said base and a movable lock bolt carried by said casing; and spring means for stressing sa'd lock bolt toward engagement with said socket.

7. In liquid dispensing apparatus, the combination with a stationary supporting base; of a casing mounted to rotate on said base; a circular series of liquid containers carried in said casing; a head fixed on said casing and rotatable therewith and carrying respective liquid dispensing outlets from each of said containers; a circular series of meters carried by said rotary head, each meter being associated with one of said outlets; liquid conduit means respectively connecting said containers with respective meters and the respective meters with said outlets; a compressed air conduit within said casing; coupling means connecting said air conduit with each of said containers; whereby compressed air may be supplied to said containers to eject liquid therefrom through the respective meters and outlets.

JOSEPH C. WOODFORD.